Patented July 25, 1933

1,919,756

UNITED STATES PATENT OFFICE

IAN C. SOMERVILLE, OF FOX CHASE, AND HARRY R. RATERINK, OF PHILADELPHIA, PENNSYLVANIA, ASSIGNORS TO RÖHM & HAAS COMPANY, OF PHILADELPHIA, PENNSYLVANIA

PROCESS OF TANNING

No Drawing.  Application filed July 25, 1932. Serial No. 624,648.

This invention relates to tanning materials and particularly to the method of preparation and the use of a new tanning agent which produces very satisfactory and hitherto unattained results, especially in the making of white leather. This application is a continuation in part of Serial No. 550,754 filed July 14th, 1931.

It has long been known that synthetic tanning materials may be prepared by condensing sulphonic acids by means of aldehydes. The colour of the leather produced by these materials is dependent to a large extent on the colour of the solution of condensed sulphonic acid. It has hitherto been found to be exceedingly difficult to manufacture a product of light enough colour to give consistently white leather.

Several methods have been suggested to control this aldehyde condensation such as the use of a carefully controlled range of temperature, adjustment of the concentration of acid, introduction of a metal such as zinc. By carrying out the reaction in presence of a large amount of urea or a derivative yielding urea a like result can be attained, though in this case the mechanism of reaction would appear to be different, since almost a molecular amount of urea relatively to aromatic nucleus is required.

We have now discovered a new method of control of such condensations of aromatic sulphonic acids with aldehydes, consisting in the addition of small amounts of a suitable retarding agent prior to or during the addition of the aldehyde. In this way we have found it possible to carry out very simply reactions which were formerly exceedingly difficult to control. In addition a surprising improvement in the colour of the condensed sulphonic acid is effected, by the utilization of which synthetic tanning materials have been made which produce very white leather.

The substances which are most effective for this purpose are thiourea and materials capable of producing thiourea under the conditions of the reaction, such as ammonium thiocyanate. The actual amount required is of the order of a catalytic amount but depends on the nature of the sulphonic acid to be condensed. For example in the cause of a rather un-reactive acid like naphthalene sulphonic acid the addition of 0.2 mols thiourea for each mol of naphthalene is sufficient to retard the action so greatly that it will not occur in dilute acid solution.

In strong acid solution and at higher temperature, however, the condensation of naphthalene sulphonic acid with formaldehyde alone takes place so rapidly that a dark colored resinous material is formed, whereas in the presence of as little as 0.2 mols thiourea good control is established and a well condensed light colored product is secured. With a more reactive aromatic nucleus such as phenol, a remarkable improvement in the colour may be observed with as low as .1 mol and the best possible effect is secured with less than .2 mols thiourea. Where the starting material is more complicated, for example 4.4'-dihydroxydiphenyl-dimethylmethane, a larger amount of the controlling substance is required to produce an equal amount of lightening. In this particular case for instance double the amount of thiourea required for phenol sulphonic acid is necessary.

We have found that it is apparently not necessary that the thiourea be added in the free state but that it may come into the reaction combined with another compound. For example, an addition product can be prepared beforehand from thiourea and formaldehyde and this reacted with the aromatic sulphonic acid in place of free thiourea and formaldehyde.

Such reactions may be carried out starting with the simpler aromatic hydrocarbons, but in general it is best to use a hydroxy aromatic substance such as phenol or a nucleus containing phenol. The sulphonation may be carried out by any of the standard methods using for example sulphuric acid, chlorosulphonic acid or oleum as the sulphonating agent. The nature of the finished product may be varied by changing the degree of sulphonation. The condensation is effected by means of the simpler aldehydes, formaldehyde being the most convenient though other aldehydes can be used. The amount of aldehyde chosen is the minimum amount which will give good condensation without formation of an appreciable amount of insoluble material.

At the end of the reaction the mixture is diluted, partially neutralized, and may be used directly in tanning by the methods ordinarily employed for synthetic tanning materials, that is, by themselves, and in conjunction with the customary mineral and vegetable tanning materials.

These products are also valuable in securing even colouring with acid or direct dyes, and act as mordants for basic dyestuffs.

The following examples illustrate the reactions which may be used to prepare synthetic tanning materials of this type, and show how they may be used in the preparation of leather.

*Example 1*

Heat 94 lbs. of phenol with stirring to 40° C. Add 153 lbs. of sulphuric acid (66° Beaumé) slowly. Raise the temperature to 95–100° C. and hold there for 2 hours. Cool the solution; adding 70 lbs. water to 35° C. Add 15 lbs. thiourea and stir for 10 minutes. Run in rather rapidly, 63 lbs. formaldehyde (38%), then raise the temperature to 80–85° C. for one hour. Cool the solution, add caustic soda to neutralize excess mineral acid, and dilute to 470 lbs. The solution may be used directly in tanning, some of the different types of tannages being as follows:

(*a*) Place 100 lbs. pickled sheepskins in a drum with 300 lbs. 5% salt solution and set the drum in motion. Add 75 lbs. of the material prepared above in three feeds at half hour intervals and continue drumming for 5 hours. Allow the skins to lie in the liquor overnight; run the drum for ½ hour in the morning, then drain and wash the skins thoroughly, set out, crust, and finish up by the ordinary methods.

(*b*) Take 100 lbs. of chrome tanned kidskins at the end of tannage before drying out and give a supplementary tannage. To the moist skins in 100 lbs. water in a rotating drum add 15 lbs. of the material made as above in one feed. Continue drumming for 1 hour, then wash the skins, fatliquor, set out, crust, and finish up by ordinary methods.

(*c*) Take 100 lbs. of alum tanned pigskins and give a supplementary tannage in a similar way to example (*b*). After feeding 20 lbs. of the material made as above and drumming 1 hour, add soda ash slowly until all the free acid is neutralized, then rinse, fatliquor, set out, crust, and finish up by the ordinary methods.

(*d*) Take 100 lbs. pickled calfskins and tan with a blend of liquid quebracho extract and the material prepared as above in the proportions of 3 to 1. To the skins in 300 lbs. of 5% salt solution in a rotating drum, add the mixture in four feeds at ½ hour intervals and drum for 6 hours in all. Allow the skins to lie in the liquor overnight, drum one hour in the morning, wash thoroughly, fatliquor, set out, crust, and finish up by the ordinary methods.

(*e*) Take 100 lbs. of snakeskins which have been suitably processed to the pickled state and cover with 1000 lbs. of a weak brine solution in a paddle. Add 100 lbs. of this material prepared as above, and run the paddle for 1 hour. Allow to stand overnight. Strengthen with a further portion of the tanning material next day, again paddling for 1 hour. Repeat this treatment for several days until the skins are completely tanned through, wash thoroughly, fatliquor, crust, and finish up by ordinary methods.

(*f*) In a yard tannage for heavy leather substitute in the vegetable extracts used to make up the layers 5% of the material prepared as above.

*Example 2*

Heat 94 lbs. phenol to 40° C. and add 153 lbs. sulphuric acid (66° Bé.) slowly. Raise the temperature to 95–100° C. and hold there for two hours. Cool the solution somewhat, adding 70 lbs. of water, to 80° C. Add 15 lbs. thiourea, stirring until dissolved, then 35 lbs. acetaldehyde slowly. Hold the temperature at 80–85° C. for two hours. Cool, neutralize the excess of mineral acid and dilute to desired strength. The solution may be used directly in tanning as shown in Example 1.

*Example 3*

In a flask equipped with a stirrer mix 400 lbs. of glacial acetic acid, 2 lbs. of zinc, and 228 lbs. 4.4′-dihydroxydiphenyl-dimethylmethane. Add 148 lbs. chlorosulphonic acid slowly, stir for one hour at 40° C. Then raise the temperature to 60° C. for two hours. Cool, adding 100 lbs. of water, to 35° C. Add 15 lbs. thiourea, stirring until dissolved, then 41 lbs. formaldehyde (37%) rather rapidly. Heat to 80–85° C. for one hour. Remove the excess of acetic acid by steam distillation, than neutralize excess of mineral acid, and dilute with water to desired strength. The solution may be used directly in tanning as shown in Example 1.

*Example 4*

Heat 175 lbs. sulphuric acid (66° Beaumé) to 60° C. and add 228 lbs. 4.4′-dihydroxydiphenyldimethylmethane in the course of 20 minutes. Heat at 60° C. until the mixture is water soluble. Dilute with 100 lbs.

water and cool to 35° C. Add 30 lbs. of thiourea, stirring until dissolved, then 57 lbs. formaldehyde (37%) rather rapidly. Heat at 55–60° C. for one hour. Cool, add caustic soda to neutralize the excess mineral acid, and dilute with water to desired strength. The solution may be used directly in tanning as shown in Example 1.

Example 5

Heat 94 lbs. phenol to 40° C. and add 153 lbs. sulphuric acid (66° Beaumé) slowly. Raise the temperature to 95–100° C., and hold there for two hours. Add 70 lbs. water and cool below 30° C. Add 4 lbs. ammonium thiocyanate stirring until dissolved, then 24 lbs. of formaldehyde (38%) slowly, keeping the temperature below 30° C. Raise the temperature to 80° C. and hold there for 1 hour. Cool dilute and neutralize excess mineral acid. The solution may be used directly in tanning as shown in Example 1.

Example 6

Heat 96 lbs. naphthalene with 100 lbs. 98% sulphuric acid to 140° C. for 5 hours. Cool to 130° C. and add 11.5 lbs. thiourea while stirring. Add 16.5 lbs. paraformaldehyde in small portions over a period of 2 hours and hold temperature at 135° C. for 2 hours more. Cool, dilute with water, and add alkali to neutralize the excess mineral acid. The solution may be used directly in tanning as shown in Example 1.

Example 7

To 54 lbs. of ortho-cresol add slowly with stirring, 78 lbs. of sulphuric acid (94%) keeping the temperature 70–80° C. Continue the stirring at this temperature for 1 hour. Add slowly 70 lbs. of water with sufficient cooling to hold the temperature at 70° C. Add 7.5 lbs. of thiourea, and then add slowly 40.5 lbs. of formaldehyde (37%). Stir at 70° C. for 4 hours. Cool and add caustic soda to neutralize the excess mineral acid. Dilute to 520 lbs. The solution may be used directly in tanning as shown in Example 1.

In place of ortho-cresol either para-, meta-, or a mixture may be used.

Example 8

To 132 lbs. of paratertiary butyl phenol add slowly, with stirring, 138 lbs. of sulphuric acid (94%). Heat at 95° C. for 3 hours. Cool to 80° and hold at this temperature while adding slowly 92.5 lbs. of water, 13.2 of thiourea, and 64 lbs. of formaldehyde (37%). Continue to stir at 80° C. for 5 hours. Cool, neutralize the excess mineral acid with caustic soda and dilute to 900 lbs. The solution may be used directly in tanning as shown in Example 1.

Example 9

To 50 lbs. of paratertiary butyl phenol add slowly, with stirring, 52 lbs. of sulphuric acid (94%). Heat at 95° C. for 3 hours. Cool to 80° C. and hold at this temperature while adding slowly 35 lbs. of water, and 6 lbs. of the solid addition compound of formaldehyde and thiourea (formed by condensing equimolecular amounts in dilute acid solution). After this has dissolved add slowly 16.5 lbs. of formaldehyde (37%) and stir for 5 hours at 80° C. Cool, neutralize the excess mineral acid with caustic soda and dilute to 410 lbs. The solution may be used directly in tanning as shown in Example 1.

It is to be understood that the above examples are merely illustrative of preferred embodiments of the invention and are not intended to confine the scope of the application in any way since it is apparent to anyone versed in the art that variations can be made in method of operation, temperatures, proportions of ingredients, concentrations, etc. without departing from the spirit of the invention. The scope of the invention is to be restricted only in accordance with the claims which follow. No form of the invention is claimed to the exclusion of any other form.

In the following claims the term "thiourea" is intended to cover substances yielding thiourea as well as the free compound.

What we claim is:

1. In a process of tanning the step which comprises treating the hides and skins with a tanning material comprising the reaction product of an aromatic sulphonic acid with an aldehyde and thiourea.

2. In a process of tanning the step which comprises treating the hides and skins with a tanning material comprising the reaction product of an aromatic sulphonic acid with an addition product of an aldehyde and thiourea.

3. In a process of tanning the step which comprises treating the hides and skins with a tanning material comprising the reaction product of an hydroxy aromatic sulphonic acid with an aldehyde and thiourea.

4. In a process of tanning the step which comprises treating the hides and skins with a tanning material comprising the reaction product of an hydroxy aromatic sulphonic acid with an aliphatic aldehyde and thiourea.

5. In a process of tanning the step which comprises treating the hides and skins with a tanning material comprising the reaction product of a sulphonic acid containing a phenol nucleus with an aldehyde and thiourea.

6. In a process of tanning the step which comprises treating the hides and skins with a tanning material comprising the reaction product of a sulphonic acid containing a phenol nucleus with formaldehyde and thiourea.

7. In a process of tanning the step which comprises treating the hides and skins with a tanning material comprising the reaction product of phenol sulphonic acid with an aldehyde and thiourea.

8. In a process of tanning the step which comprises treating the hides and skins with a tanning material comprising the reaction product of phenol sulphonic acid with formaldehyde and thiourea.

9. In a process of tanning the step which comprises treating the hides and skins with a tanning material comprising the reaction product of tertiary butyl phenol sulphonic acid with an aldehyde and thiourea.

10. In a process of tanning the step which comprises treating the hides and skins with a tanning material comprising the reaction product of tertiary butyl phenol sulphonic acid with formaldehyde and thiourea.

11. In a process of tanning the step which comprises treating the hides and skins with a tanning material comprising the reaction product of the sulphonation product of 4.4'-dihydroxydiphenyl dimethylmethane with an aldehyde and thiourea.

12. In a process of tanning the step which comprises treating the hides and skins with a tanning material comprising the reaction product of the sulphonation product of 4.4'-dihydroxydiphenyl dimethylmethane with formaldehyde and thiourea.

13. In a process of tanning the step of treating hides and skins with vegetable tannins mixed with materials comprising the reaction product of an aromatic sulphonic acid with an aldehyde and thiourea.

14. In a process of tanning the step of treating hides and skins with mixed synthetic tanning materials, said mixture containing a reaction product of an aromatic sulphonic acid with an aldehyde and thiourea.

15. In the process of retanning hides and skins the step of treating them with a reaction product of an aromatic sulphonic acid with an aldehyde and thiourea.

16. In the process of retanning chrome-tanned leather the step of treating the leather with a reaction product of an aromatic sulphonic acid with an aldehyde and thiourea.

17. In the process of tanning the step of treating hides and skins with a reaction product of an aromatic sulphonic acid with an aldehyde and thiourea where the reactants have the molecular ratio: for 1 of sulphonic acid, not more than 1.0 aldehyde, not more than 0.2 thiourea.

18. In the process of tanning the step of treating hides and skins with a reaction product of a phenol sulphonic acid with an aldehyde and thiourea where the reactants have the proportion mentioned in claim 17.

19. In the process of tanning the step of treating hides and skins with a reaction product of phenol sulphonic acid with an aldehyde and thiourea where the reactants have the molecular ratio: for 1 of phenol, not more than 1.0 aldehyde, not more than 0.2 thiourea.

20. In a process of tanning the step which comprises treating hides and skins with a reaction product of phenol sulphonic acid with formaldehyde and thiourea where the reactants have the proportions mentioned in claim 19.

IAN C. SOMERVILLE.
HARRY R. RATERINK.